April 13, 1926. 1,580,249
D. H. HORNOR
INTERNAL COMBUSTION ENGINE
Filed Sept. 8, 1921 5 Sheets-Sheet 3

INVENTOR.
Dayton H. Hornor
BY
ATTORNEYS.

April 13, 1926.

D. H. HORNOR

INTERNAL COMBUSTION ENGINE

Filed Sept. 8, 1921

INVENTOR.
Dayton N. Hornor
BY
ATTORNEYS.

April 13, 1926. 1,580,249
D. H. HORNOR
INTERNAL COMBUSTION ENGINE
Filed Sept. 8, 1921 5 Sheets-Sheet 5

INVENTOR.
Dayton H. Hornor
BY
ATTORNEYS.

Patented Apr. 13, 1926.

1,580,249

UNITED STATES PATENT OFFICE.

DAYTON H. HORNOR, OF DUNSMUIR, CALIFORNIA.

INTERNAL-COMBUSTION ENGINE.

Application filed September 8, 1921. Serial No. 499,340.

*To all whom it may concern:*

Be it known that I, DAYTON H. HORNOR, a citizen of the United States, and a resident of Dunsmuir, in the county of Siskiyou and State of California, have invented new and useful Improvements in Internal-Combustion Engines, of which the following is a specification.

This invention relates to internal combustion engines, and one of the principal objects is to provide in an internal combustion engine, improved means for imparting the power impulses from the reciprocating pistons to a rotating power shaft without the necessity of providing the off-set connecting rod pins, such as are employed on ordinary crank shafts as used in other well known types of engines.

Another object is to provide an improved design of internal combustion engine wherein the various cooperating elements are caused to function so that the power impulses from any even number of cylinders, 16 or less, may be imparted to a straight power shaft of the character mentioned, and whereby the relation of the various elements may be changed from low compression to medium or high compression by the change of but one small and readily accessible part for an engine of eight cylinders or less, or by the change of but two parts for an engine of sixteen cylinders, thus adapting the engine to the use of fuels of different characteristics and requiring different compression, and also to different ignition systems.

A further object of the invention is to provide an engine which is so designed, and in which the several parts are so related as to provide a double acting engine in which the power impulses are applied at opposite ends of the cylinders, and in which the necessity for stuffing boxes or cross heads is entirely obviated. This construction serves to simplify the engine to a large extent, reduce the number of parts, and increase its efficiency.

A still further object of my invention is to provide an engine of improved and simple design, whereby the assembly and disassembly of the several parts may be facilitated, and to so relate the various parts as to effect a marked reduction of the total weight of an engine, of given power, thus reducing the cost of manufacture to a minimum and increasing the efficiency of operation.

Other minor and detailed objects may appear as the description progresses.

I attain these several objects of my invention by means for the mechanism shown in the accompanying drawings, in which I have illustrated two separate designs of engine embodying substantially the same principle, one of said designs being of the horizontal type and the other of the vertical type.

Figure 1:
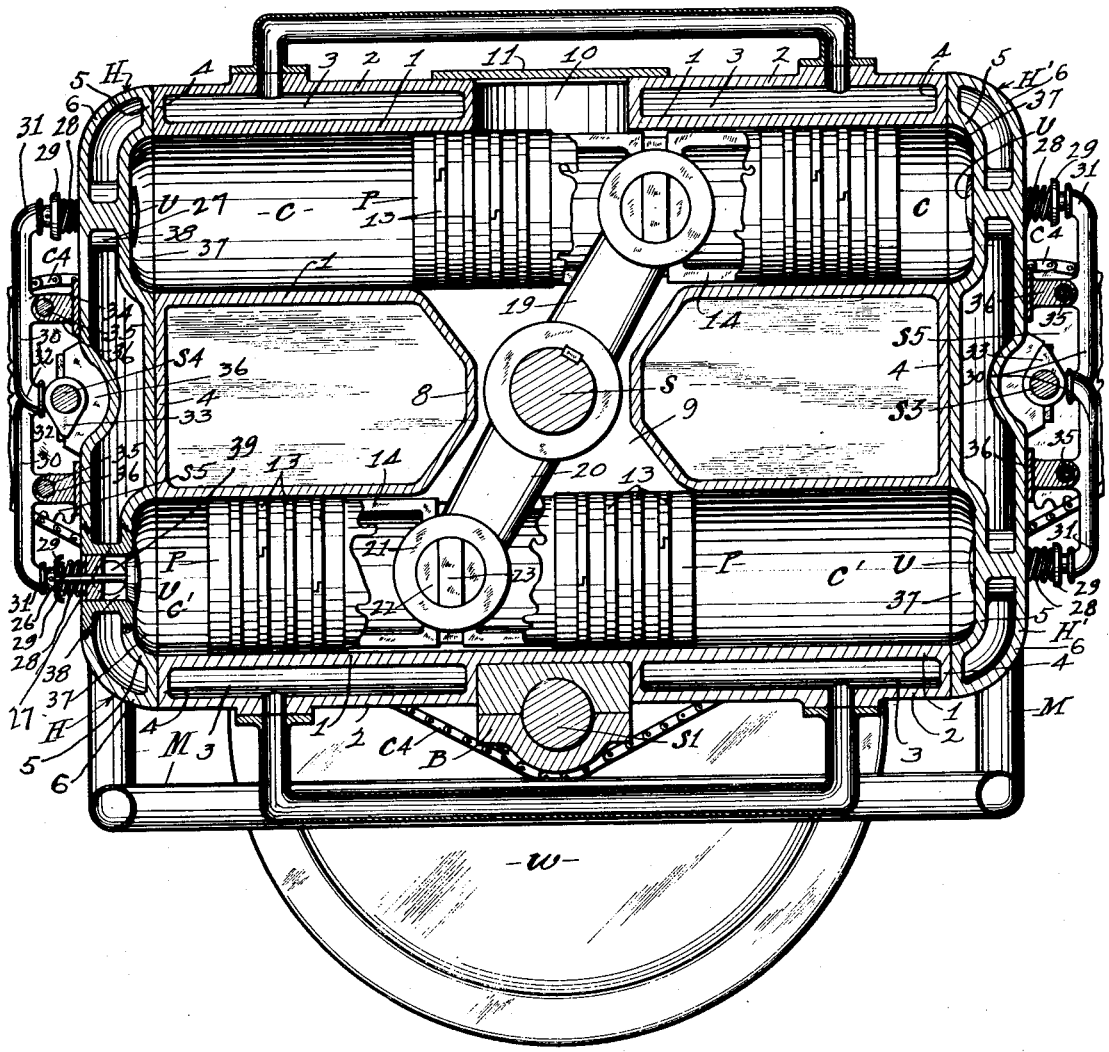
Fig. 1 is a sectional elevation of the horizontal type engine.
Figure 2:
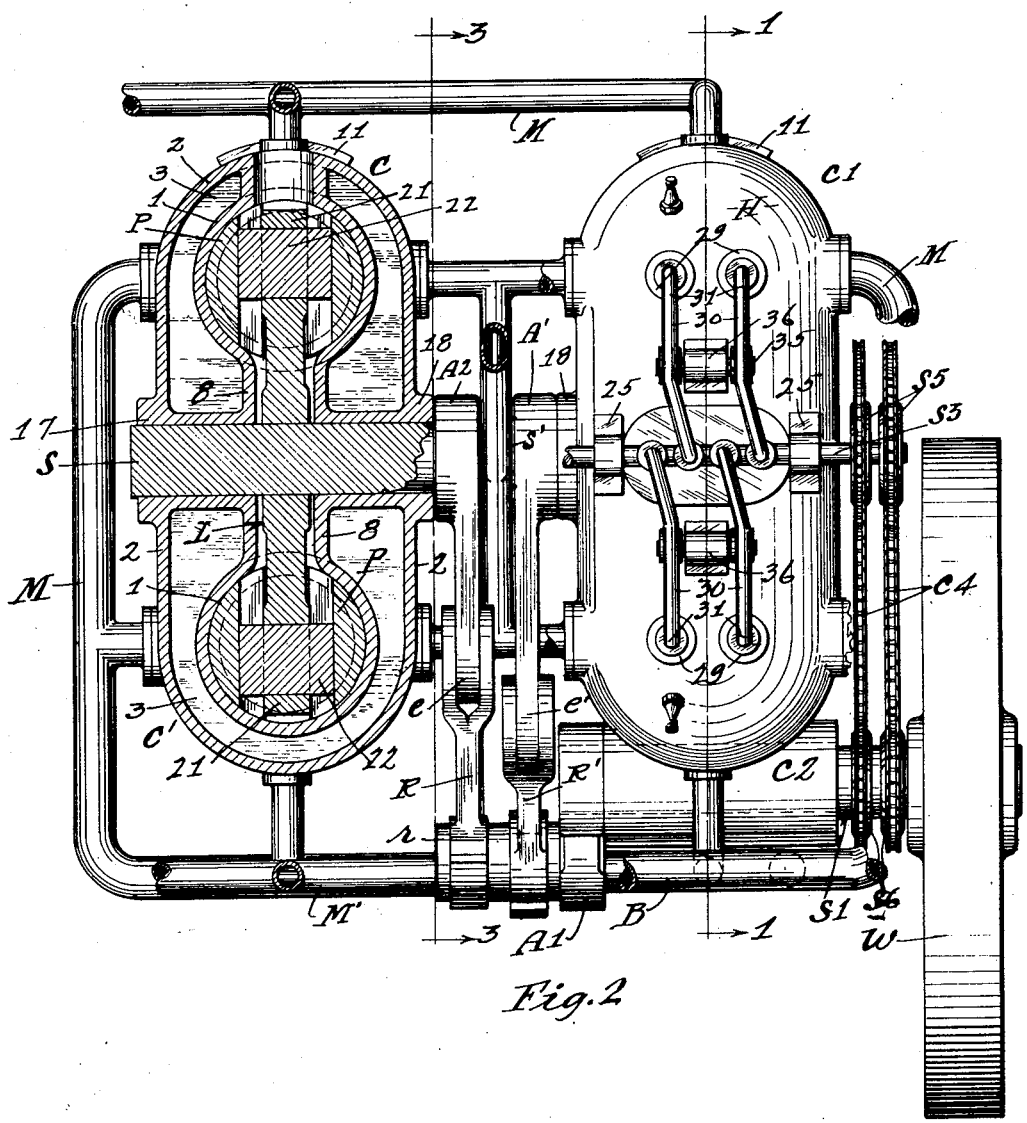
Fig. 2 is an end elevation of the same, partly in section.

It will be understood from reference to the aforesaid drawings, that while I have shown in the two separate forms of device a four cylinder unit, that I may add other cylinders as may be required, or desirable, without changing the scope of my invention or departing from the spirit thereof.

Similar characters of reference are employed throughout the specification and in the drawings for illustrating similar or like parts, except in Figs. 6, 7, 8 and 9, where other characters are used.

I will first describe the horizontal type of engine, shown in Figs. 1 to 5 inclusive. In this type of engine I have shown four cylinders C, C', C¹, and C², arranged in pairs the cylinders C and C¹ being respectively mounted above the cylinders C' and C². Each of the cylinders has a circular inner wall 1, and an outer jacket 2, between which is provided a water chamber 3 which is closed by end walls 4. Said cylinders also have separable heads H and H' at opposite ends thereof, which have inner walls 5 and outer walls 6, with water chambers 7 therein adapted for communication with the chambers 3 of the cylinders proper.

The cylinders C and C' and cylinders C¹ and C² are paired and cast in a single block and the blocks are connected at a central point by a hollow portion 8, having a chamber 9 therein, and the upper portion of cylinders C and C¹ have central passages 10 communicating with the bore of the cylinders and closed by means of a plate 11, thus providing a hand hole whereby entrance to the cylinders may be effected from the top, for any desired purpose.

The pistons P are of the same design and character for each of the several cylinders, and each includes a circular ring carrying portion 12, on the opposite ends thereof, having grooves for receiving a plurality of rings 13, 13, etc., and an intermediate circular portion 14. It will be noted that the pistons are of elongated form, and that the opposite ends are of similar character and size, and the pistons are so disposed in the cylinders as to receive power impulses from opposite ends of the cylinder when directed against the piston heads 14'.

The central portions 14 of said pistons are provided with vertically disposed elongated slots 15, open on diametrically opposite portions of the piston, and also a pair of transversely disposed grooves 16 substantially midway of the ends of the pistons and communicating at their open ends with the slots 15. Centrally mounted between the pairs of cylinders C, C' and C¹, C², I provide transverse horizontally disposed and alined rock shafts S and S' respectively, which extend through the chambers 9 of the connection portions 8, between the cylinders of each pair and are journaled at their ends in bearings 17 and 18 in the cylinder block. On the shafts S and S' in each cylinder unit, I provide an oscillating lever L which has a pair of like and oppositely disposed arms 19 and 20, one of which extends upwardly, and the other downwardly from the hub of the lever. In the ends of said lever arms I provide bearings 21 which carry bearing members 22 having tongues 23, 23, formed in alinement on opposite faces thereof, and adapted to seat in and slidably engage the grooves 16 formed on opposite sides of the longitudinal groove 15 in the pistons P.

Centrally mounted between the ends of the cylinders and below either of the lower cylinders C' and C² I provide a straight transverse power shaft S¹ which is mounted in a split bearing B on the lower portion of the cylinder.

The shaft S¹ may have a fly wheel W mounted on the extended end thereof, at one end of the bearing B, and the other end of said shaft is provided with a crank arm A¹ which is somewhat similar, but slightly shorter than the crank arm A' on the correspondingly extended end of the rock shaft S', by means of a connecting rod R'. Arm A¹ carries a pin r, which is pivotally held on the lower end of the connecting rod R', and the lower end e' of arm A' carries a pin a' which is pivotally connected with the upper end of the connecting rod R'.

Likewise, the inner end of shaft S carries a crank arm A², similar to the arm A' on the shaft S', and the lower end e of said arm is pivotally held on a pin a which pivotally supports the upper end of the connecting rod R, while the lower end of said connecting rod is pivotally held on the pin r of the arm A¹. At the opposite ends of the cylinder blocks I provide cam shafts S³ and S⁴ which may be operated from the shaft S¹ by means of sprocket chains or belts C⁴, C⁴, adapted to operate over driven sprockets S⁵, S⁵, on the shafts S³ and S⁴, and over driving sprockets S⁶, S⁶ on the shaft S¹. The cam shafts S³ and S⁴ are carried in bearing brackets 25 attached to the cylinder heads H, H, and H', H', and said shafts are disposed in a horizontal plane and extend transversely over and between the upper and lower cylinders of each pair.

The opposite heads of all of the cylinders are similar and each have intake and exhaust valves, as at V. Said valves have stems 26 which are slidably held in bosses 27 in the center of the heads, and carry springs 28 on their outer ends which compress between the usual collars 29 and the ends of the cylinder heads.

Each of said valves has an associated rocker arm 30, one end 31 of which engages the valve stems 26 for compressing the springs 28 and opening the valves V, and the other ends 32 of which engage and are actuated by cams 33 on the shafts S³ or S⁴, as the case may be. Said rocker arms have central portions 34 which are mounted on horizontal rocker arm shafts 35 supported in bearings 36 formed on or attached to the cylinder heads.

The heads H have compression chambers 37 in the ends thereof which communicate with intake and exhaust passages 38, formed outwardly of the valve seats, and suitable ports 39 are provided in the heads for affording communication between the chambers 38 and intake and exhaust manifolds M and M' respectively, the particular arrangement of these intake and exhaust passages being immaterial to my invention.

The operation of the horizontal type engine is as follows: As the fuel is admitted to the heads H and H' through the valves V by the operation of the cam shafts S³ and S⁴, which serve to open and close the valves, the successive charges of fuel are thereafter compressed at one end of said cylinder, while the piston P induces a charge of fuel at the opposite end of the cylinder. The return stroke of the piston, which is a power stroke, on one end of the cylinder, compresses the charge of gas at the other end, and the succeeding stroke of the piston exhausts at the first end on the power stroke at the other end. The firing of the cylinder through the medium of spark plugs may be timed as in all other types of four cycle engines, so as to maintain a proper balance and a maximum power ratio.

As shown particularly in Fig. 1 the pistons in the cylinders of each pair move at all times in opposite directions, and in a four cylinder unit of the double acting type, such as I have shown and described, it will be apparent that I have provided means for producing four power impulses to each revolution of the power shaft. This action is accomplished by means of the oscillating levers L connected with the pistons P in the manner described, and the corresponding rotation of the power shaft $S^1$ effected through the connection of the connecting rods R and R' and the crank arms A', $A^2$, and $A^1$.

It will be noted in this regard that the arms A' and $A^2$ are substantially longer than arm $A^1$, and that the first mentioned arms oscillate to a sufficient extent to effect a complete revolution of the arm $A^1$ and the associated shaft $S^1$.

Figure 3:
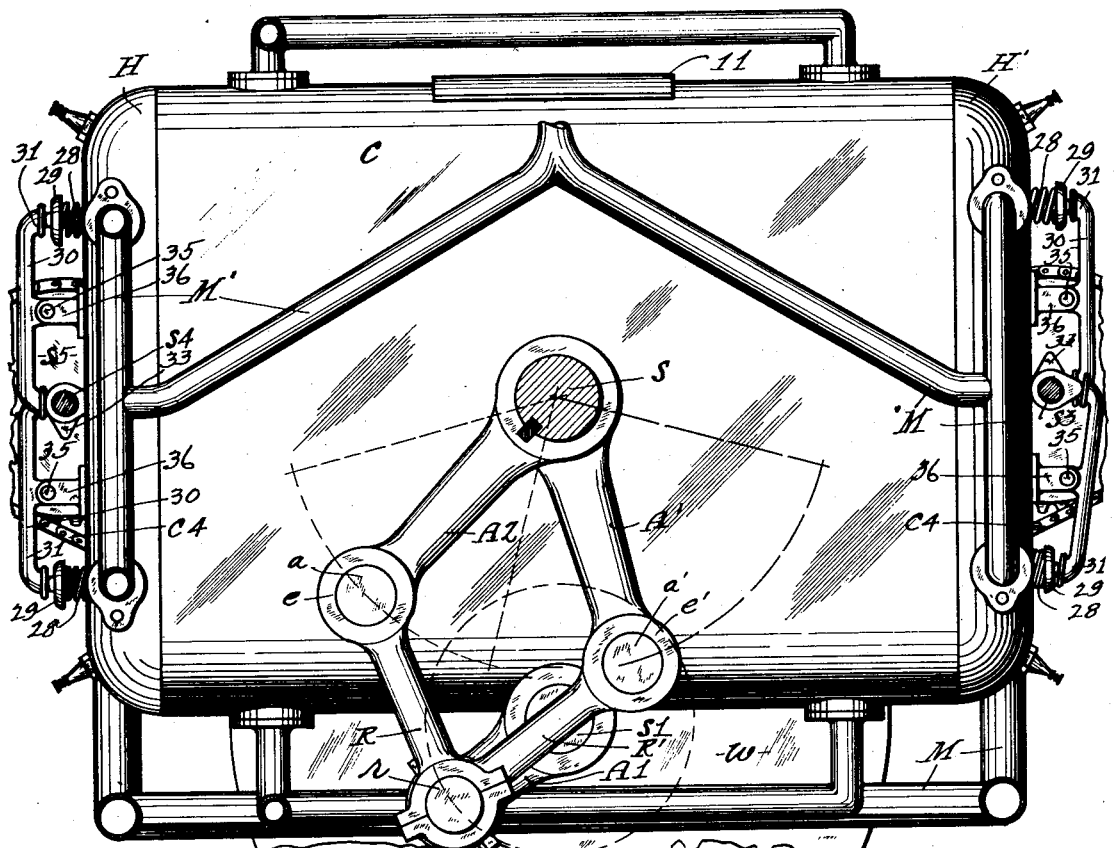
Fig. 3 is a sectional elevation of the same on line 3—3 of Fig. 2.

For instance, referring to Fig. 3, assuming that the arm $A^2$ has not yet reached its extreme of movement in a clockwise direction, and the arm A' is moving in a reverse direction, while the arm $A^1$ is rotating in a clock-wise direction. The further movement of the arm $A^2$ in the direction stated will serve to turn the arm $A^1$ in a clockwise direction, while the further movement of the arm A' in a reverse direction will be correspondingly moved and will serve to move the arm $A^1$ over the center, until the upper extreme of movement of arm A' is reached, when the reverse condition will be true and the arm $A^2$ will move the arm $A^1$ downwardly over the center. Thus, the operation of the mechanism is balanced at all times and the movement of two pistons in opposite directions will effect one-half of a revolution of the crank arm $A^1$, while the reverse movement of the said pistons will complete a revolution of the arm $A^1$.

In the vertical type engine such as is shown in Figs. 6, 7, 8, and 9, it will be observed that the cylinders C, C', $C^1$, $C^2$ are vertically disposed and arranged in pairs at right angles to the plane of a central rock shaft 40. Each of the cylinders has the circular inner walls 1 and the outer water jacket walls 2, the water jacket of cylinders C and $C^1$ being common to both cylinders, and likewise the jacket of cylinders C' and $C^2$ being common to both cylinders. The bottoms of all of the cylinders are open and communicate with a crank case 41 common to all of the cylinders, and detachably held on the lower end of the cylinder blocks, as shown particularly in Fig. 6. Heads H, H, etc., are also provided on the upper end of said cylinders and are detachably held thereon by suitable means, and are of substantially the same design as in the horizontal type of engine, previously described. Said heads have water portions 42 formed between the inner walls 43 and outer walls 44 of the heads and the intake and exhaust valves V, V, etc., and mounted so as to seat centrally in the inner walls 43 on heads, and have the valve stems 26 thereon which extend upwardly through the central hollow portions 38, as in the horizontal type of engine.

Figure 4:
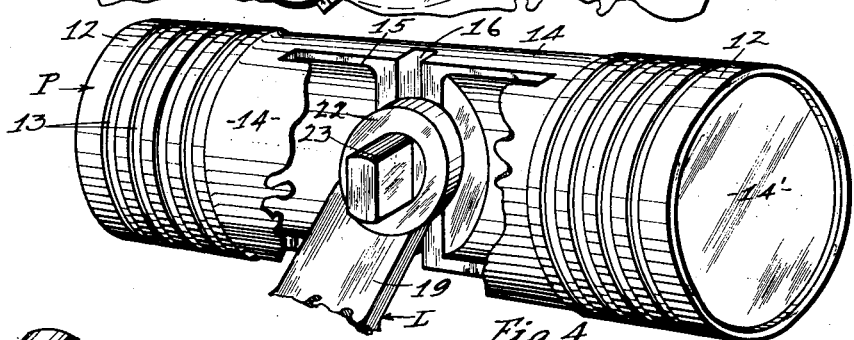
Fig. 4 is a perspective view of a double piston for one of the cylinders, showing a crank arm connected therewith.
Figure 5:
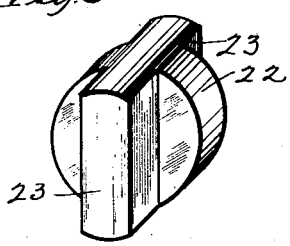
Fig. 5 is a perspective view of one of the connecting members for slidably connecting the crank arms with the pistons.
Figure 6:
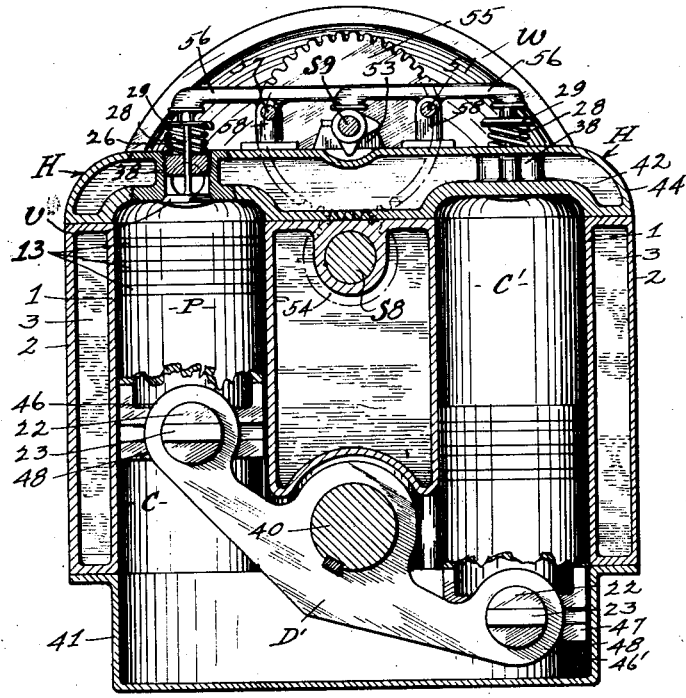
Fig. 6 is a sectional elevation of a vertical type engine.
Figure 7:
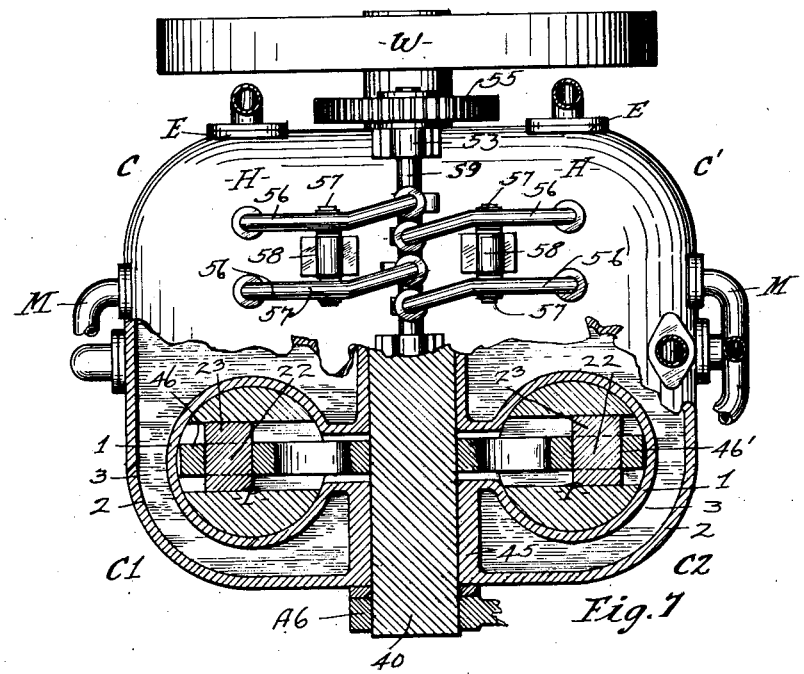
Fig. 7 is a plan of the same, partly in section.
Figure 8:
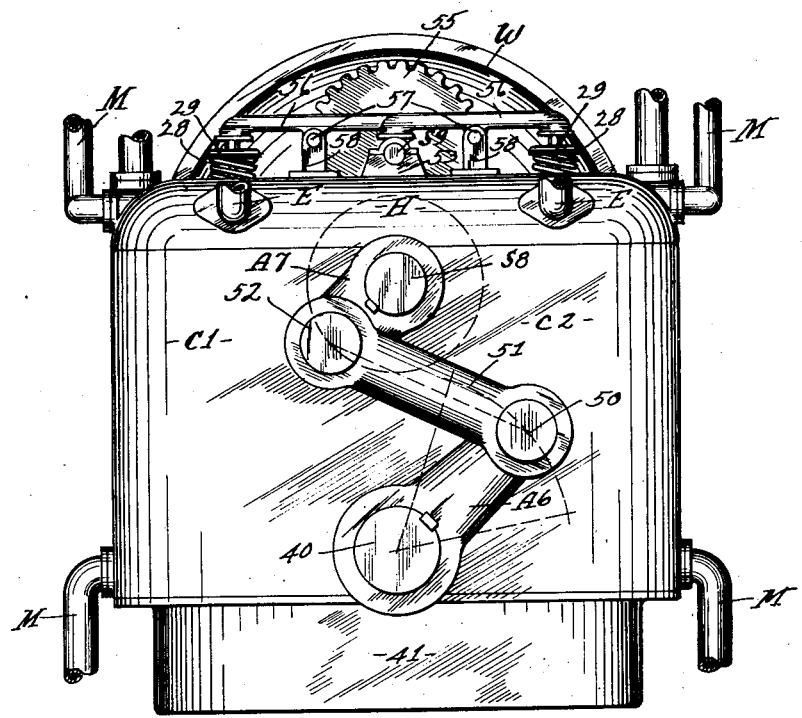
Fig. 8 is an end elevation of the same.
Figure 9:
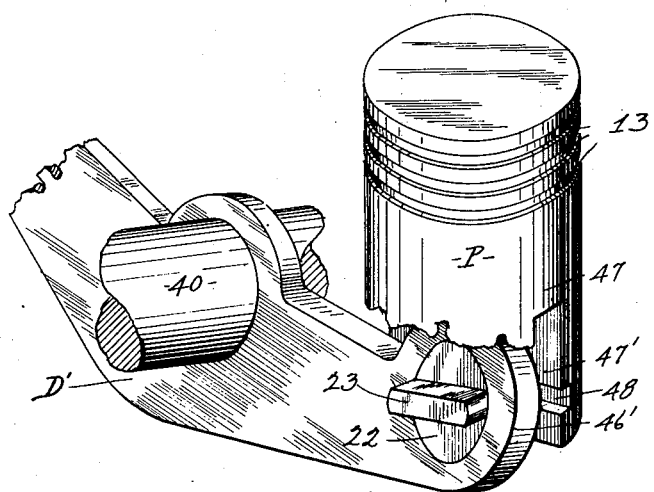
Fig. 9 is a perspective view showing the connection between one of the cranks and pistons, in a vertical type engine.

The cylinders in this type of engine receive the charges of fuel only at their upper ends, as in the ordinary type of four cycle engines, and the pistons P, P, move vertically in said cylinders. The rock shaft 40 at the bottom of the cylinders is substantially journaled in the connecting portion 45 of each cylinder pair, and carries a crank D with arms 46 and 46' extended at equal distances on each side of the axis of said shaft. Said arms as shown in Fig. 9 are connected with depending portions 47 and are slidably held in slots 47' formed therein, paralleling the axis of the pistons. Transverse grooves 48 are also formed in the portions 47 and communicate with the grooves 47' for the reception of tongues 23 formed on the bearing members 22, such as shown in Fig. 4 of the horizontal type engine.

Thus, it will be seen that as the pistons P, P, are moved vertically in the cylinders, the crank arms D of each pair will be oscillated correspondingly to the vertical move ment of the pistons, and the tongues 23 of the swivel members will slide transversely in the grooves 48 of the portions 47 of the pistons, while the central circular portions of said bearing members will turn at the ends 46 and 46' of the crank arms.

The ends of the rock shaft 40 are provided with arms $A^6$ and said arms are pivotally connected at 50 with one end of a connecting rod 51, said connecting rod being pivotally attached at 52 to a crank arm $A^7$ on the extended ends of a centrally mounted power shaft $S^8$ extending longitudinally between the cylinders and in parallelism with the rock shaft 40. Said shaft may be provided with suitable bearings mounted between the cylinders, and it will be apparent that the rotation of the power shaft is accomplished through the oscillation of the rock shaft 40 in the same manner as the horizontal type engine, which I have previously described.

A cam shaft $S^9$ is mounted on brackets 53, 53 at the ends of the cylinder blocks, and substantially above the power shaft $S^8$ and parallel therewith. Said cam shaft is operably connected with the power shaft $S^8$ by means of a driving gear 54 and a driven gear 55, and serves to operate both the exhaust and intake valves through the medium of rocker arms 56, 56, etc., mounted on rock shafts 57, 57, respectively. Said rocker arm shafts are carried at brackets 58, 58, mounted on the cylinder head.

It will be understood, of course, that the cam shaft $S^9$ is provided with a cam for each of the rocker arms 56 and each of the intake and exhaust valves V is associated with one of said rocker arms and is provided with springs 28 for restoring said valves to closed position. Intake manifolds M, M are provided for connection with the outer sides of the heads H and the exhaust manifolds M may be connected with exhaust outlets E, E, on the sides of the cylinders, as shown.

It will be understood that I have not attempted to show all of the details of an internal combustion engine which are not pertinent to my invention, but have shown only a sufficient structure to illustrate the use and operation of the several improvements of my invention.

It will be noted that an engine constructed substantially in accordance with the drawings forming a part of my application, will eliminate in the case of a double acting engine the use of stuffing boxes and cross heads, and thus simplify the design and facilitate the assembling and disassembly of the several parts; also the excessive wear is eliminated and the number of wearing parts are reduced to a minimum. The engine as designed, is readily accessible for repairs and inspection, and the wearing parts may be replaced with facility and dispatch. The compound movement which I have provided for connecting the power shaft with the reciprocating pistons is of such character that vibration will be minimized and a smooth running engine provided.

It will also be understood that as shown in the drawings, my improved principle may be embodied in either a double acting or single acting engine, of either horizontal or vertical type, and that several units of from four to 16 cylinders each may be connected with a common power shaft.

Attention is also called to the fact that it is necessary to employ only one connecting rod between the rock shaft and power shaft for each unit of four cylinders, while the operation of an eight cylinder unit will require only two connecting rods, three connecting rods are necessary for a unit of twelve cylinders, and four of such rods for an engine of sixteen cylinders. In each case the connecting rods are connected with a straight power shaft having no bends or throws as in the usual types of internal combustion engines.

The compression ratio of the engine may be changed by varying the relative lengths of the crank arms attached to the power shafts and rock shafts.

Furthermore, I may arrange the cylinders at various angles as in other V-type engines, if desirable, without departing from the principle shown and described, and the proper timing of the power impulses remains the same whether the cylinders are placed horiontally, vertically, or at whatever angle may be desired.

What I claim is:

1. An internal combustion engine including a cylinder, a piston reciprocably held in said cylinder, a shaft transversely disposed relative to the cylinder, a rocker arm on said shaft, said piston having a diametrically disposed opening extending therethrough and transversely disposed grooves formed on the opposite sides of said opening, the free end of said rocker arm being adapted to seat in said opening, and a bearing member held in said arm and having tongues engaging said grooves whereby said bearing member will be reciprocated as said piston is reciprocated in the cylinder to permit the oscillation of said arm.

2. An internal combustion engine including a cylinder, a piston reciprocably held in said cylinder, a shaft transversely disposed relative to the cylinder, a rocker arm on said shaft, said piston having a diametrically disposed opening extending therethrough and transversely disposed grooves formed on the opposite sides of said opening, the free end of said rocker arm being adapted to seat in said opening, a bearing member held in said arm and having tongues engaging said grooves whereby said bearing member will be reciprocated as said piston is reciprocated in the cylinder, and a power shaft paralleling said rocker arm shaft and operatively connected therewith for rotation, due to the successive power impulses imparted to said piston.

3. An internal combustion engine including a pair of spaced parallel cylinders, pistons reciprocably mounted therein and adapted to receive power impulses at the opposite ends thereof, a rocker shaft horizontally disposed between said cylinders, a rocker arm fixed to said shaft and having the ends thereof extended into diametrically formed openings in said pistons, transverse grooves being formed in the opposite sides of the openings in the pistons, and bearing members pivotally carried in the end of said rocker arms and having tongues engaging said grooves, as described.

4. An internal combustion engine including a pair of spaced parallel cylinders, pistons reciprocably mounted therein and adapted to receive power impulses at the opposite ends thereof, a rocker shaft horizontally disposed between said cylinders, a rocker arm fixed to said shaft and having the ends thereof extended into diametrically formed openings in said pistons, transverse grooves being formed in the opposite sides of the openings in the pistons, bearing members carried in the ends of said rocker arms and having tongues engaging said grooves, and a power shaft operably connected with said rock shaft.

5. An internal combustion engine including a pair of spaced parallel cylinders, pistons reciprocably mounted therein and adapted to receive power impulses at the opposite ends thereof, a rocker shaft horizontally disposed between said cylinders, a rocker arm fixed to said shaft and having the ends thereof extended into diametrically formed openings in said pistons, transverse grooves being formed in the opposite sides of the openings in the pistons, bearing members carried in the ends of said rocker arms and having tongues engaging said grooves, and a power shaft operably connected with said rock shaft, said connection including a rotatable crank arm fixed to said power shaft, and an oscillatable crank arm fixed to said shaft, and a connecting rod connecting said crank arm and said oscillatable arm.

6. An internal combustion engine including a pair of spaced parallel cylinders, pistons reciprocably mounted therein and adapted to receive power impulses at the opposite ends thereof, a rocker shaft horizontally disposed between said cylinders, a rocker arm fixed to said shaft and having the ends thereof extending into diametrically formed openings in said pistons, transverse grooves being formed in the opposite sides of the openings in the pistons, bearing members carried in the end of said rocker arms and having tongues engaging said groovs, and a power shaft operably connected with said rock shaft, said connection including a rotatable crank arm fixed to said power shaft, an oscillatable crank arm fixed to said shaft, and a connecting rod connecting said crank arm and said oscillatable arm, and means for imparting power impulses to the opposite ends of the pistons in each of said cylinders at timed intervals.

7. An internal combustion engine including a cylinder, block having a plurality of parallel cylinders spaced apart, a rock shaft journaled in said block between and disposed at right angles to the axis of said cylinders, a rocker arm fixed to said rock shaft, a piston reciprocally mounted in each of said cylinders and having diametrically formed and longitudinally disposed openings therein for receiving the opposite ends of said rocker arm, transverse grooves being formed in the opposite sides of said opening, bearing members carried in the ends of said rocker arm and having tongues engaging said grooves, whereby at each movement of said pistons said bearing members will be oscillated in said arm and said rock shaft oscillated corresponding to the movement of said pistons.

8. An internal combustion engine including a cylinder, block having a plurality of parallel cylinders spaced apart, a rock shaft journaled in said block between and disposed at right angles to the axis of said cylinders, a rocker arm fixed to said rock shaft, a piston reciprocally mounted in each of said cylinders and having diametrically formed openings therein for receiving the opposite ends of said rocker arm, transverse grooves being formed in the opposite sides of said openings, bearing members carried in the ends of said rocker arm and having tongues engaging said grooves whereby at each movement of said pistons said bearing members will be oscillated in said arm and said rock shaft oscillated corresponding to the movement of said pistons, and a power shaft operably connected with said rock shaft.

9. An internal combustion engine including a cylinder block having a plurality of parallel cylinders spaced apart, a rock shaft journaled in said block between and disposed at right angles to the axis of said cylinders, a rocker arm fixed to said rock shaft, a piston reciprocably mounted in each of said cylinders and having diametrically formed openings therein for receiving the opposite ends of said rocker arm, transverse grooves being formed in the opposite sides of said opening, bearing members carried in the ends of said rocker arm and having tongues engaging said grooves whereby at each movement of said pistons said bearing members will be oscillated in said arm and said rock shaft oscillated corresponding to the movement of said pistons, and a power shaft connected with said rocker shaft whereby the oscillation of the rock shaft will effect the rotation of said power shaft.

10. An internal combustion motor including a cylinder block having a cylinder therein, a rock shaft disposed at one side of and at right angles to the axis of said cylinder, a piston reciprocably held in said cylinder, a rocker arm fixed to said shaft and having a bearing member in the end thereof slidably connected with said piston so that when the piston moves in a longitudinal path, said bearing member will move transversely of the piston.

11. An internal combustion motor including a cylinder block having a cylinder therein, a rock shaft disposed at one side of and at right angles to the axis of said cylinder, a piston reciprocably held in said cylinder, a rocker arm fixed to said shaft and having a bearing member pivotally held in the end thereof and slidably connected with said piston so that when the piston moves in a longitudinal path, said bearing member will move transversely of the piston, and a power shaft operably connected with said rock shaft.

12. An internal combustion motor including a cylinder block having a cylinder therein, a rock shaft disposed at one side of and at right angles to the axis of said cylinder, a piston reciprocably held in said cylinder, a rocker arm fixed to said shaft and having a bearing member pivotally held in the end thereof and slidably connected with said piston so that when the piston moves in a longitudinal path, said bearing member will move transversely of the piston, a power shaft paralleling said rock shaft, a crank arm on said power shaft, a crank arm on said rock shaft, and a connecting rod operably connecting said crank arms, whereby the oscillation of said rock shaft will effect the rotation of said power shaft.

DAYTON H. HORNOR.